United States Patent [19]

Nussmeier et al.

[11] 4,398,256
[45] Aug. 9, 1983

[54] IMAGE PROCESSING ARCHITECTURE
[75] Inventors: Thomas A. Nussmeier, Thousand Oaks; Scott D. Fouse, Canoga Park, both of Calif.
[73] Assignee: Hughes Aircraft Company, El Segundo, Calif.
[21] Appl. No.: 244,397
[22] Filed: Mar. 16, 1981
[51] Int. Cl.³ .............................................. G06F 15/36
[52] U.S. Cl. .................................... 382/41; 364/554; 358/160; 382/54
[58] Field of Search ................ 364/515, 554; 358/160; 340/728, 146.3 G

[56] References Cited
U.S. PATENT DOCUMENTS
3,549,877 12/1970 Goldman .............................. 364/554
3,846,755 11/1974 Hart ............................ 340/146.3 G
4,328,426 5/1982 D'Ortenzio ......................... 364/515

Primary Examiner—Gary Chin
Attorney, Agent, or Firm—Gerald B. Rosenberg; Kenneth W. Float; Anthony W. Karambelas

[57] ABSTRACT

Image processing sections and associated circuitry for generating signals indicative of the centered moments of a sliding submatrix window of signals located within a larger image matrix are disclosed. The processing sections include registers for storing signals indicative of the columnar sums of the signals within an intermediate submatrix of signals and for storing the sum of a subset of the columnar sums that is thereby indicative of the sum of the signals within the sliding submatrix window and, further is equivalent to an uncentered moment of the signals within the sliding submatrix window. The signals stored in the registers are continuously updated as the sliding submatrix window is sequentially moved within the image matrix. The associated circuitry combines the uncentered moment signals to produce centered moment signals.

11 Claims, 6 Drawing Figures

IMAGE PROCESSING ARCHITECTURE

BACKGROUND OF THE INVENTION

The present invention relates generally to image processing systems and more particularly to image processing systems which determine statistical moments associated with each pixel of the image.

Image processing systems often calculate values for the mean and moments of each pixel of a rectangular array of pixels that comprise an image scene. The mean and moments (centered moments) are calculated for a sliding window centered on every pixel in the image, with the resulting mean and moments assigned to the center pixel position. For example, a typical image size might be 256 by 256 pixels with a sliding window size of 15 by 15 pixels. Considering a sliding window comprised of 225 pixels, the mean of the 15 by 15 array of pixels is given by the equation $\bar{x} = 1/N \Sigma x_i$, where $x_i$ represents the intensity of the ith pixel, N is the total number of pixels in the sliding window, and the summation is from $i=1$ to N, and represents the summation over all pixel elements of the window. For purposes of statistical analysis, the mean ($\bar{x}$) may be considered equivalent to the first centered moment of the sliding window. The higher order centered moments are determined from the equation $Mk = 1/N \Sigma (x_i - \bar{x})^k$, where x represents the mean, and k is the particular moment being determined.

In prior art systems, to calculate one of the moments for a single pixel it was necessary to take the signal value in each pixel, subtract the mean from each value, raise the resulting value to the correct power, sum all 225 values in the sliding window, and then divide by 225. This represents 450 additions and 225 multiplications per pixel. In a typical television image situation, there are 65,536 pixels in each image and each image lasts 1/60th of a second. This results in a computation rate of about $2.6 \times 10^9$ calculations per second for each moment, neglecting computation of the mean.

It is clear, considering the voluminous number of calculations required to determine each of the centered moments, that it would be an improvement in the art to have a system which provides for a reduction in the number of calculations required to produce these computations.

SUMMARY OF THE INVENTION

It is therefore a feature of the present invention to provide a system which greatly reduces the computations necessary to generate the centered moments of an image.

Another feature of the present invention is to provide a system which allows the centered moments to be calculated in real time.

It is also a feature of the present invention to provide a system in which an increase in the size of the sliding window does not increase the number of calculations required to generate the centered moments.

In accordance with these and other features and advantages of the present invention, there is provided an image processing system that incorporates an image processing architecture which determines the centered moments of a sliding window on an image. The invention comprises a plurality of processing sections, each of which determines a particular uncentered moment. The various uncentered moments are then applied to processing circuitry which combines the uncentered moments in accordance with a predetermined relationship to produce the desired centered moments of the sliding window.

More particularly, a first processing section of the present invention provides circuitry that processes sequentially applied signals which are representative of a matrix of pixels that form an image scene. Output signals from the section are useful in determining predetermined statistical moments associated with a predetermined pixel of the matrix. The output signals are derived from computations performed on a submatrix of pixels (sliding window) centered around the predetermined pixel. The sliding window sequentially steps through the matrix so that each pixel in the matrix has output signals computed therefore during each scan of the matrix by the sliding window. The output signals are provided when a new sequentially applied signal is encountered and a corresponding predetermined pixel is encountered during each scan.

The invention comprises column storage circuitry which stores first signals indicative of respective columnar sums of signals located in a predetermined set of rows of the matrix associated with the predetermined pixel. Window storage circuitry is provided for storing second signals indicative of sums of a predetermined subset of columnar sums (the sliding window) of the predetermined set of rows of the matrix. This predetermined subset of sums constitutes the running sum of all signals in the sliding window. Pixel storage circuitry is provided for storing third signals indicative of a predetermined pixel associated with a first predetermined column of the sliding window. First summing circuitry is provided which generates fourth signals which are indicative of the sum of the first signals and the sequentially applied signals minus the third signals, with the fourth signals updating the first predetermined columnar sum. Finally, second summing circuitry is provided which generates fifth signals indicative of the sums of the second signals and fourth signals minus signals indicative of a second predetermined columnar sum of the sliding window. The fifth signals update the second signals of the window storage circuitry and provide the output signals of the processing section.

In operation, the processing section receives applied signals from a signal source, such as a source of video signals, or the like, and applies the signals to the pixel storage circuitry. The pixel storage circuitry delays the applied signals by a predetermined number of pixels, with the delay being equal to the total number of pixel elements in the predetermined set of rows of the matrix. The applied signals and the delayed signals are applied to inputs of the first summing circuitry along with the first predetermined columnar sum from the column storage circuitry. The applied signals are added to the columnar sum and the delayed signals are subtracted therefrom to produce an updated columnar sum. This updated columnar sum is reapplied to the column storage circuitry for subsequent use and is also applied to the window storage circuitry. The column storage circuitry is a delay line which stores running sums of the signals located in columns of the sliding window. The sliding window sum is then updated by applying the output from the first summing circuitry, the second predetermined columnar sum output, and the second signals which represent the sum of all signals in the sliding window to the second summing circuitry. The second summing circuitry adds the updated columnar sum to the sliding window value and subtracts the second predetermined columnar sum therefrom to produce the updated sliding window sum. The output of the second summing circuitry is reapplied to the window storage circuitry for later use, and also provides the output for this particular processing section.

Thus, in order to compute a new sum of the signals in the sliding window it is only necessary to provide four addition steps to accomplish this task. This is contrasted to approximately 224 additions required in conventional systems. Also, increasing or decreasing the size of the sliding window does not increase the number of calculations utilizing the principles of the present invention.

Utilization of the concepts of the present invention also provides for determination of higher order uncentered moments associated with the sliding window. The circuitry required for computing the higher order uncentered moments includes all the above circuits except for the third storage circuitry which delays the applied signals. In order to compute the second order moment, additional circuitry is required which squares the values of the applied signals and delayed signals prior to the their application to first summing circuitry. Thus, in the second order moment calculation the square of signals is processed so as to provide output signals which are the sum of the squares of the sliding window as it moves through the matrix.

Similarly, third, fourth, or any other higher order uncentered moment may be determined utilizing the present invention. The basic circuit may be utilized for all such calculations and the only additional hardware required is that which raises the signals applied to the circuit to the correct power for the particular uncentered moment.

In order to determine the centered moments of the sliding window it is necessary to apply the outputs of the various processing sections, which have computed the uncentered moments, to circuitry which combines the uncentered moments in accordance with a predetermined relationship. Various summing and multiplication circuits are required, but the computation is made in a straightforward manner in accordance with the predetermined relationship and conventional techniques known in the art.

BRIEF DESCRIPTION OF THE DRAWINGS

The foregoing features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
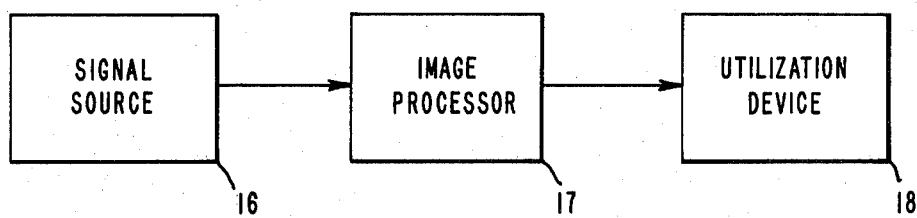
FIG. 1 shows a typical systems application implementing the present invention.

Referring to FIG. 1 there is shown a typical systems application implementing the present invention. For example, a signal source 16, such as video camera, detector array or radar receiver, or the like, which utilizes a typical video data format, provides signals to an image processor 17. The processor 17 utilizes circuitry that employs the principles of the present invention, and which manipulates the applied signals in a manner to be fully described hereinbelow. Generally, however, the processor 17 manipulates the signals in a manner which performs a statistical analysis of predetermined signals surrounding a particular signals in a matrix-type display format, and substitutes the manipulated signals for the signals value of the particular signal in order to obtain a better image. The processor applies the manipulated signals to utilization circuitry 18, or the like, for further computation or processing.

Figure 2:
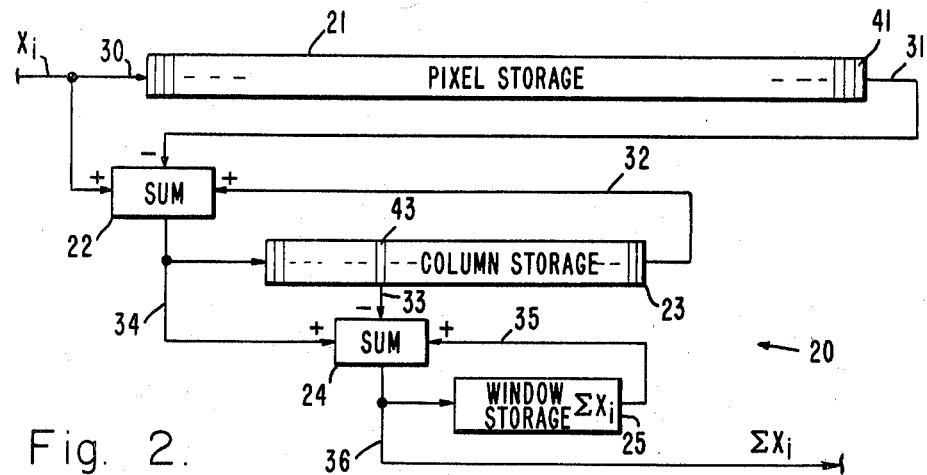
FIG. 2 illustrates the first processing section which computes uncentered moments in accordance with the principles of the present invention.

Referring to FIG. 2 there is shown a processing section 20 comprising circuitruy which processes sequentially applied signals 30, such as video signals, or the like, to provide output signals 36 which are indicative of the sum of preselected signals processed thereby. The output signals 36 are indicative of the sum of all signals located in a sliding window on an image. The applied signals 30 ($x_i$) are applied to the input of pixel storage circuitry 21, such as a storage shift register, or the like, which acts to delay the sequentially applied signals 30 a predetermined number of pixels. The sliding window represents a submatrix of pixel elements of an image scene for which statistical moments calculations are determined. The quantities computed for the sliding window are assigned to a center pixel of the sliding window. The sliding window generally comprises a submatrix of pixel elements, for example, a 15 by 15 element matrix, which is a subset of the entire image matrix, which may comprise a 256 by 256 element array. The pixel storage circuitry 21 processes the applied signals 30 to provide delayed output signals 31 located in the pixel identified as 41 (shown in FIG. 4), which are delayed a predetermined number of pixels in the matrix. The number of pixels which the applied signals 30 are delayed is determined from the size of the matrix and the size of the sliding window. For example, if the sliding window has 15 rows therein and the matrix has 256 columns, then the total number of storage elements in the pixel storage circuitry 21 comprises 15 times 256, or 3,840 pixel values.

Column storage circuitry 23, such as a second storage shift register, or the like, is provided which stores running sums of respective columns of the sliding window. The applied signals 30, a first predetermined output signals 32 of the column storage circuitry 23, and the delayed output signals 31 of the pixel storage circuitry 21, are applied to first summing circuitry 22. The first summing circuitry 22 generates an output signal 34 which is the sum of the column output signals 32 from the column storage circuitry 23 and the applied signals 30, minus the delayed output signals 31 from the pixel storage circuitry 21. This output signal 34, which is an updated sum, is reapplied to the column storage circuitry 23. Window storage circuitry 25 is provided which stores the running sum for all signals in the sliding window. Output signals 35 from the window storage circuitry 25, the output signals 34 (updated column sum) from the first summing circuitry 22, and a second columnar output signal 33 from a second predetermined column 43 of the column storage circuitry 23, are applied to second summing circuitry 24. The output signals 35 from the window storage circuitry 25 are added to the output signals 34 from the first summing circuitry 22, and the second columnar output signals 33 from the column storage circuitry 23 are subtracted therefrom to produce an updated sum for the sliding window. This updated sum is applied to the summing circuitry 25 for storage thereby and is additionally provided as an output signal 36 ($\Sigma x_i$) from the processing section 20. The column which is updated by the first summing circuitry 22 is that column which is encountered by the sliding window when it steps one column. The second predetermined column 43 (shown in FIG. 4) represents that column of the sliding window which is dropped when the sliding window steps to the new position.

Figure 3:
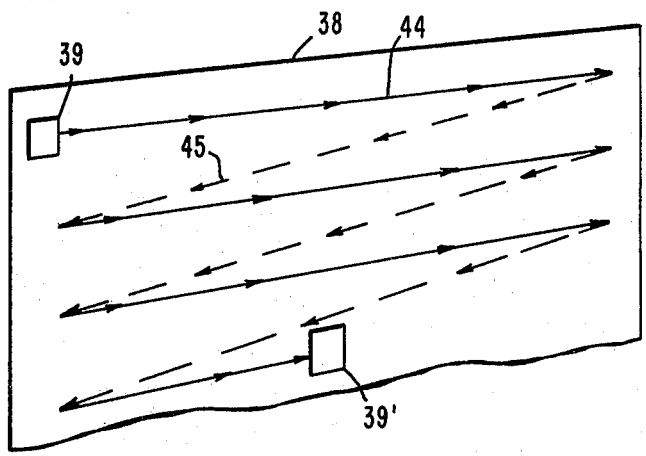
FIG. 3 illustrates the motion of the sliding window through the matrix.
Figure 4:
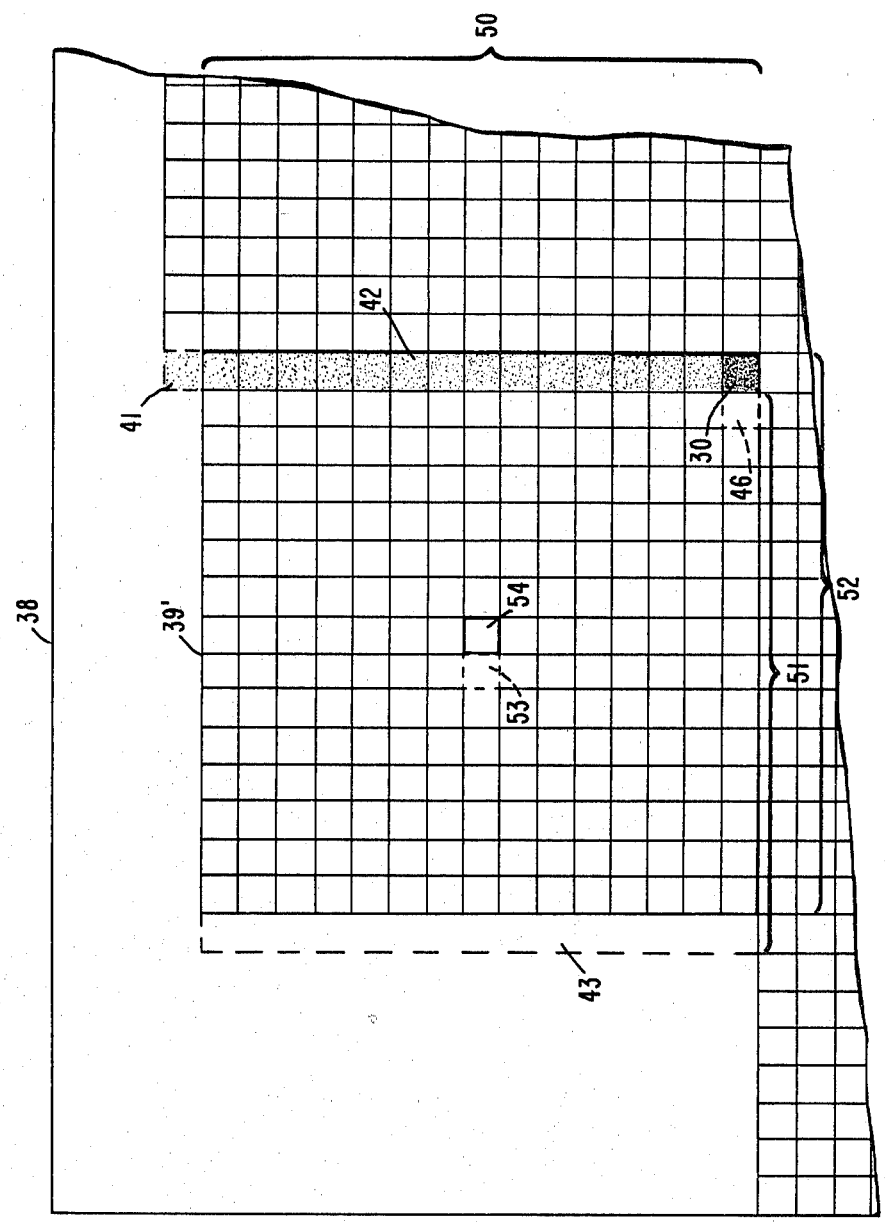
FIG. 4 shows the operation of the sliding window and illustrates the principles of the present invention.

A much clearer understanding of the present invention may be obtained with reference to FIGS. 3 and 4. FIG. 3 shows the motion of a sliding window 39 through a matrix 38. The path of the sliding window 39 is that shown by the solid arrows 44 as it steps across the matrix 38. At the end of the matrix 38 the sliding window 39 retraces a path to the left as indicated by the dashed arrow 45. Thus, the sliding window 39 scans a path row by row through the entire matrix 38. The sliding window 39' represents a particular location of the sliding window 39 within the matrix 38.

Referring to FIG. 4 there is shown a portion of the matrix 40 showing the sliding window 39' at some arbitrary position in the matrix 38 as shown in FIG. 3. Essentially, two positions of the sliding window 39' are shown and are those positions before and after a shift of one pixel to the right. The various operations of the present invention are shown with reference to FIG. 4. In particular, the sliding window 39' is a 15 by 15 pixel matrix having rows and columns identified by brackets 50 and 51, respectively. As is indicated hereinabove, the present invention stores running sums of the columns of the matrix 38, with the columns being 15 pixels long as indicated by bracket 50. The total number of columnar sums stored is 256, or the total number of columns in the matrix 38. The present invention also stores the sum of all pixel elements within the sliding window 39' as defined by brackets 50 and 51, and assigns this stored value to the pixel identified as 53. In addition, the present invention stores delayed signals associated with all pixels in a 15 row submatrix of the entire matrix 38 through which the sliding window 39' steps. This constitutes a total of 15 times 256 pixels stored and delayed, or 3,480 pixels. With reference to FIG. 4, this amounts to storing and delaying the pixel values starting with the pixel identified as 41 and storing each succeeding pixel value in the rows identified by bracket 50 up to including the pixel value identified by pixel 46.

Thus, when the present invention receives a newly applied signal 30, a computation is made for a new sliding window which is associated with the center pixel identified as 54. The rows and columns of the new sliding window 39' is identified by brackets 50 and 52. In order to compute the sum of all the values in the sliding window 39' it is necessary to take the newly acquired signal 30, add it to the existing stored column 42 and subtract out the old pixel value identified by pixel 41. This provides the updated column at the leading edge of the sliding window 39'. This updated column is added to the already existing sum of the stored columns of the sliding window 39'. The trailing column identified as column 43 is then subtracted from this computed sum to derive the sum of all signals contained within the sliding window 39'. This value is assigned to the pixel identified as 54.

It is to be understood that this computational concept may be employed when computing any sum associated with the sliding window 39'. For instance, the sum of the squares of the sliding window may be computed by simply squaring the pixel values prior to operation of the computational scheme. Similarly, all succeeding higher order sums may be computed in a similar manner by first raising the signal values to the appropriate power and then computing the sum of the signals contained within the sliding window utilizing the principles of the present invention. This provides for computation of all higher order uncentered moments associated with the sliding window 39'.

Figure 5:
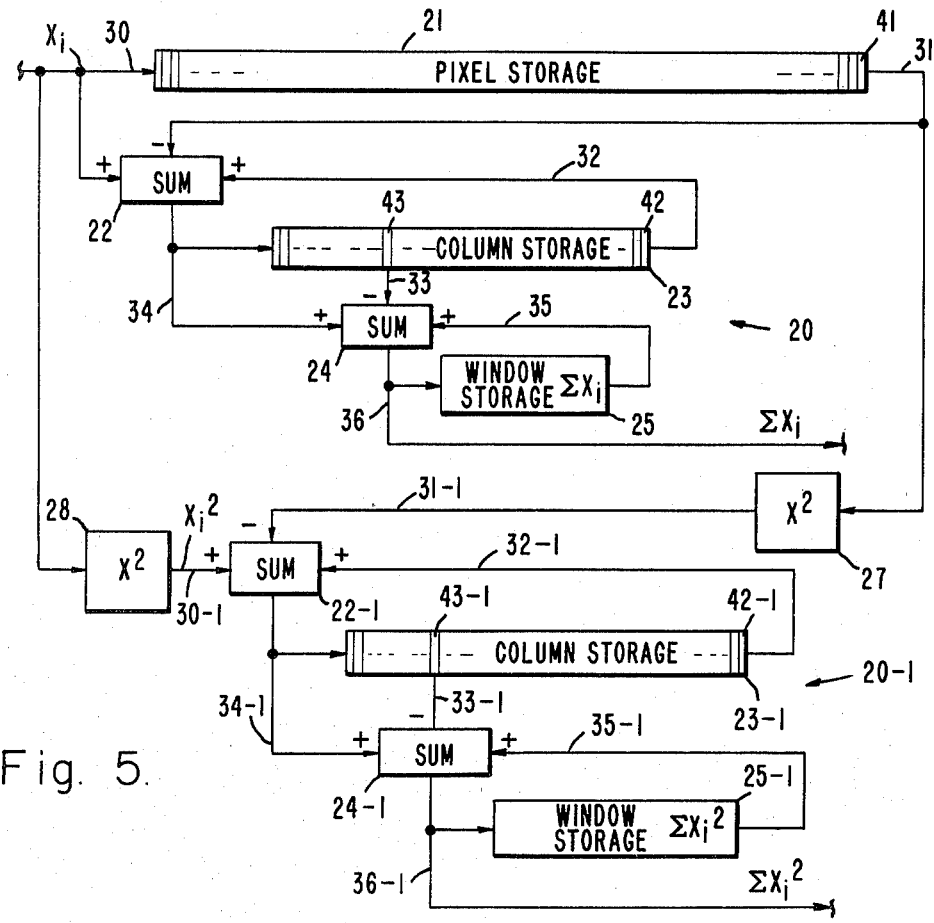
FIG. 5 shows circuitry which implements the first two uncentered moments.

To amplify this, reference is made to FIG. 5 which shows apparatus which computes the first two uncentered moments associated with the sliding window 39'. The top portion of FIG. 5 shows the processing section 20 identical to that of FIG. 2 and the bottom processing section 20-1 of FIG. 5 shows substantially the same circuit as FIG. 2 except that there is no pixel storage means 21. The second circuit also includes multiplier circuitry 27, 28 for squaring the applied signal values which are then applied to the second processing section 20-1. The connection and operation of the second processing section 20-1 is substantially identical to that of the FIG. 2 circuit, but the operation is on squares of pixel signal values. Accordingly, the output of the second processing section 20-1 provides the sum of the squares of the signals located in the sliding window 39', ($\Sigma x_i^2$).

Figure 6:
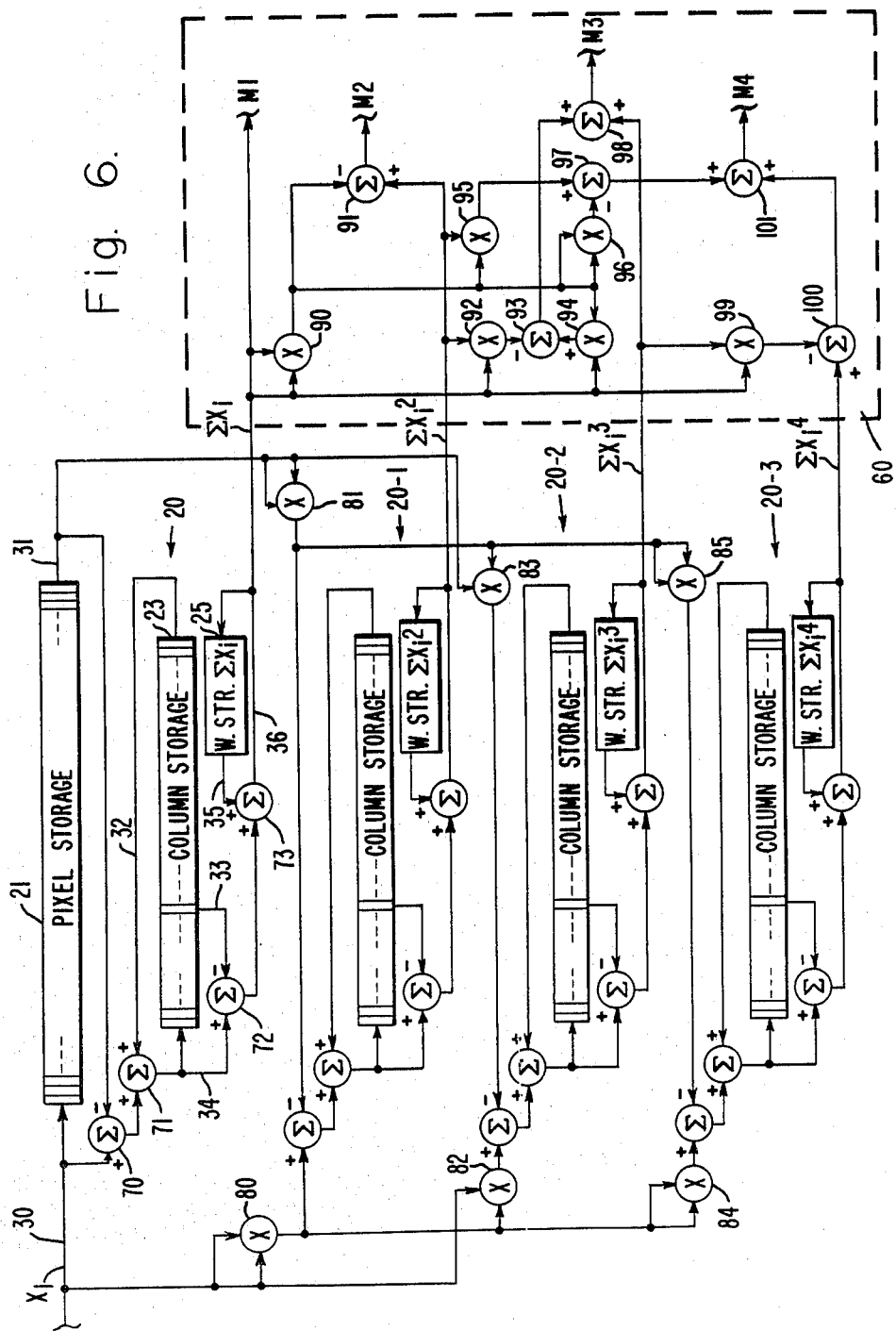
FIG. 6 illustrates circuitry which computes the first four centered moments derived from the first four uncentered moments.

Referring now to FIG. 6 there is shown circuitry which computes the first four uncentered moments associated with the sliding window 39' which is coupled to circuitry identified by the reference numeral 60 which provides for the centered moments associated with each pixel of the sliding window 39'. The lefthand portion of FIG. 6 shows four basic circuits which are substantially identical to the circuits discussed in FIGS. 2 and 5. However, two input summing devices are utilized in this embodiment whereas in the embodiments of FIGS. 2 and 5, three input summing devices were used. The combination of two input summing devices of FIG. 6 operates to perform the same function as the three input summing devices of FIGS. 2 and 5.

For example, summer 70 takes the applied signals 30 and subtracts the delayed signals 31 provided by the pixel storage circuitry 21 therefrom. The output of the summer 70 is applied to a second summer 71 which adds the output of the first summer to the first predetermined columnar sum output 32 of the column storage circuitry 23. This summation produces the columnar sum of the leading column 42 encountered by the sliding window 39'. Summers 70 and 71 perform the same function as the three input summing device 22 of FIG. 2. The third summer 72 takes the output from the second summer 71 and subtracts the second predetermined column output 33 therefrom (trailing column identified by column 43 in FIG. 4). The output of the third summer 72 is applied to a fourth summer 73 which adds the output of the third summer 72 to the sum (output 35) of all the pixels in the sliding window 39' to produce the desired output 36 of the first processing section 20. In a similar manner, the succeeding circuits which compute the higher order uncentered moments of the sliding window 39' operate in substantially the same manner but utilize signal inputs which have squared signal values, cubed signal values and fourth power signal values, respectively. For example, the multipliers 80, 81 square the signals applied to the second processing section 20-1. Similarly, multipliers 82, 83 provide for cubed inputs to the third processing section 20-2, while multipliers 84, 85 provide for the fourth power of the signal values to be utilized in the fourth processing section 20-3.

The outputs of the four processing sections 20, 20-1, 20-2, 20-3 of FIG. 6 provide the first four uncentered moments associated with the sliding window 39'. The generalized equations for the centered moments are given by:

$$M1 = \bar{x} = 1/N \Sigma x_i, \quad (1)$$

and $$Mk = 1/N \Sigma (x_i - \bar{x})^k \quad (2)$$

for the higher order moments, where $x_i$ represents the intensity of the $i^{th}$ pixel in the sliding window 39' and $\bar{x}$ is the mean of the sliding window 39'. The summation sign in the preceding equations indicate a sum over all pixel elements in the entire sliding window 39'. The variable k indicates any particular higher order moment and may take values from 2 to 4 in the above equations, but generally may take any integral value. The uncentered moments from the four processing sections 20 to 20-3 are applied to the circuitry 60 which computes the first four centered moments utilizing the uncentered moments. The first four centered moments are determined in terms of the uncentered moments, from the equations:

$$M1 = 1/N \Sigma x_i \quad (3)$$

$$M2 = -1/N^2 (\Sigma x_i)^2 + 1/N \Sigma x_i^2 \quad (4)$$

$$M3 = 2/N^3 (\Sigma x_i)^3 - 3/N^2 \Sigma x_i^2 (\Sigma x_i) + 1/N \Sigma x_i^3 \quad (5)$$

$$M4 = -3/N^4 (\Sigma x_i)^4 + 6/N^3 \Sigma x_i^2 (\Sigma x_i)^2 - 4/N^2 \Sigma x_i^3 (\Sigma x_i) + 1/N \Sigma x_i^4 \quad (6)$$

The processing circuitry 60 implements the computation of equations 3 through 6. The multiplication and summing devices and operations performed by the circuitry 60 are conventional and well-known in the art. However, for purposes of clarity, the output $\Sigma x_i$ of the first processing section 20 is provided as the first centered moment of the processing system. The output $\Sigma x_i$ of the first section 20 is squared in a multiplier 90 whose output $(\Sigma x_i)^2$ is applied to one input of a summer 91. The output $\Sigma x_i^2$ of the second section 20-1 is applied to the second input of the summer 91 which combines the applied signals to provide the second centered moment of the system as given in equation (4).

The output $\Sigma x_i$ of the first section 20 is applied to inputs of two multipliers 92, 94, while the output $\Sigma x_i^2$ of the second section 20-1 is applied to the other input of the multiplier 92 and the output $(\Sigma x_i)^2$ of the multiplier 90 is applied to the other input of the multiplier 94. The outputs $\Sigma x_i (\Sigma x_i^2)$ and $(\Sigma x_i^3)$ of the multipliers 92, 94, respectively, are applied to a summer 93 whose output $\Sigma x_i^3 - \Sigma x_i \Sigma x_i^2$ is applied to one input of a summer 98. The output $\Sigma x_i^3$ of the third section 20-2 is applied to the other input of the summer 98 which combines the applied signals to produce the third centered moment of the system as given in equation (5).

The output $(\Sigma x_i)^2$ of the multiplier 90 is multiplied with the output $\Sigma x_i^2$ of the second section in a multiplier 95, whose output $\Sigma x_i^2 (\Sigma x_i)^2$ is applied to one input of a summer 97. The output $(\Sigma x_i)^2$ of the multiplier 90 is also squared in a multiplier 96 whose output $(\Sigma x_i)^4$ is applied to a second input of the summer 97. The output $\Sigma x_i^2 (\Sigma x_i)^2 - \Sigma x_i^4$ of the summer 97 is applied to an input of a summer 101. The output $\Sigma x_i$ of the first section 20 is multiplied with the output $\Sigma x_i^3$ of the summer 100. The output $\Sigma x_i$ of the first section 20 is multiplied with the output $\Sigma x_i^3$ of the third section 20-2 in a multiplier 99, whose output $\Sigma x_i \Sigma x_i^3$ is combined with the output $\Sigma x_i^4$ of the fourth section in a summer 100. The output $\Sigma x_i^4 - \Sigma x_i \Sigma x_i^3$ of the summer 100 is applied to an input of the summer 101 and combined with the output $\Sigma x_i^2 (\Sigma x_i)^2 - (\Sigma x_i)^4$ of the summer 97 to produce the fourth centered moment of the system as given in equation (6).

The multipliers used in conjunction with the present invention may be commercially available multipliers, such as Analog Devices IC Programmable Multiplier Divider Computation Circuit, Models AD531 or AD532, or the like. Suitable summers may be obtained by use of resistive divider networks or a two input operational amplifier circuit, or the like, which is commonly known in the art.

It may be noted that equations 3 through 6 include various constants: $1/N$, $1/N^2$, $2/N^3$, etc., and such constants are not shown in FIG. 6. The reason they are not shown is that, since they are constants, appropriate multiplication with the various uncentered moments ($\Sigma x_i$, $\Sigma x_i^2$, etc.) may be accomplished at many places in the computational process as is well-known in the art. For example, the above-identified multipliers generally have weighted programmable inputs which allow the applied signals to be weighted by the value of a particular constant. In addition, the summation devices are also programmable, so that their inputs may be weighted so as to provide for multiplication of a particular signal by a particular constant value. These procedures are well-known in the electronics and signal processing arts, and hence, these procedures are not fully described. Clearly, the basic concept of the present invention is the manner in which the uncentered moments are generated and not in the manner in which they are combined.

Thus, the present invention provides for a system which processes applied video signals, or the like, and which computes predetermined statistical moments associated with a sliding window on a matrix of video signals. The computations involved in computing the centered moments are substantially less complex than those of convention systems and the hardware required to implement such computations is also less complex. Also, the total number of computations required to obtain the desired values are far less than those in conventional systems. The present invention operates in real time which provides for greater utility when used in modern signal processing systems.

It is to be understood that the above-described embodiments are merely illustrative of some of the many specific embodiments which represent application of the principles of the present invention. Clearly, numerous and varied other arrangements may be readily devised by those skilled in the art without departing from the spirit and scope of the invention. For example, the above-described embodiments incorporate analog signal processing, which utilize analog shift registers, multipliers and summers. Clearly, however, digital embodiments could be fabricated by utilizing digital components, by those skilled in the art, utilizing the concepts of the present invention.

What is claimed is:

1. Apparatus, for processing sequentially applied signals which are representative of a matrix of pixels to provide output signals useful for determining predetermined statistical moments associated with a predetermined pixel of said matrix, said output signals being derived from computations performed on a submatrix of pixels centered around said predetermined pixel which sequentially steps through said matrix in a manner such that each pixel in said matrix has said output signals computed therefore during each scan of said matrix, said apparatus determining said output signals when a new sequentially applied signal is encountered and a corresponding predetermined pixel is encountered during each scan, said apparatus comprising:

(a) first means for storing first signals indicative of respective columnar sums of signals located in a predetermined set of rows of said matrix associated with said predetermined pixel;

(b) second means for storing second signals indicative of the sum of a predetermined subset of columnar sums of said predetermined set of rows of said matrix;

(c) third means for storing third signals indicative of a predetermined pixel associated with a first predetermined column of said predetermined subset of columnar sums;

(d) fourth means for providing said first signals which are indicative of the sum of a first predetermined one of said stored first signals and said third signals, minus a predetermined one of said stored third signals, said fourth means providing said first signals to said first means so as to update said predetermined columnar sums stored thereby; and (e) fifth means for providing said second signals which are indicative of said sum of a predetermined subset of columnar sums and said first signals minus a second predetermined one of said stored first signals indicative of a second predetermined columnar sum of said predetermined subset of columnar sums, said fifth means providing said second signals to said second means so as to update said sum of a predetermined subset of columnar sums stored thereby, said second signals being provided as said output signals of said apparatus.

2. Apparatus for processing sequentially applied signals which are representative of a matrix of pixels to provide output signals useful for determining predetermined uncentered statistical moments associated with a predetermined pixel of said matrix, said output signals being derived from computations performed on a submatrix of pixels centered around said predetermined pixel which sequentially steps through said matrix in a manner such that each pixel in said matrix has said output signals computed therefore during each scan of said matrix, said predetermined moments being determined from the equation $Mk = 1/N\Sigma(x_i - \bar{x})^k$, where N is the total number of pixels in a submatrix of said matrix which is used to determined said output signals, $x_i$ is a signal indicative of a pixel in said submatrix, x is the mean of signals indicative of the pixels in said submatrix, and k is a particular moment, and wherein the first moment is given by $M1 = 1/N\Sigma x_i$, said apparatus determining said output signals when a new sequentially applied signal is encountered and a corresponding predetermined pixel is encountered during each scan, said apparatus comprising:

(a) a first processing section including a first set of means comprising:

(i) first means for storing first signals indicative of respective columnar sums of signals located in a predetermined set of rows of said matrix associated with said predetermined pixel;

(ii) second means for storing second signals indicative of the sum of a predetermined subset of columnar sums of said predetermined set of rows of said matrix;

(iii) third means for storing third signals indicative of a predetermined pixel associated with a first predetermined column of said predetermined subset of columnar sums;

(iv) fourth means for providing said first signals which are indicative of the sum of a first predetermined one of said first signals and said third signals, minus a predetermined one of said stored third signals, said fourth means providing said first signals to said first means so as to update said predetermined columnar sums stored thereby; and (v) fifth means for providing said second signals which are indicative of said sum of a predetermined subset of columnar sums and said first signals minus a second predetermined one of said stored first signals indicative of a second predetermined columnar sum of said predetermined subset of columnar sums, said fifth means providing said second signals to said second means so as to update said sum of a predetermined subset of columnar sums stored thereby, said second signals being provided as said output signals of said apparatus and which are indicative of the first uncentered moment of said submatrix.

3. The apparatus of claim 2 further comprising:

(a) a second processing section including a second set of first, second, fourth and fifth means as provided in claim 2;

(b) multiplier means for responding to and squaring said applied signals and said predetermined one of said stored third signals provided by said third means of said first set of means, said squared applied signal and said squared predetermined one of said stored third signals being provided to said fourth means of said second set of means as signals corresponding to said applied signals and said predetermined one of said stored third signals provided to said fourth means of said first set of means, said second signals of said second set of means being provided as the output signals of said second set of means, whereby the output signals of said second set of means provides a sum of the squares of signals of said submatrix, which are indicative of the second uncentered moment of said submatrix.

4. The apparatus of claim 3 further comprising:

(a) a third processing section which includes a third set of first, second, fourth and fifth means as provided in claim 2; and (b) multiplier means for responding to and cubing said applied signals and said predetermined one of said stored third signals provided by said third means of said first set of means, said cubed applied signals and said cubed predetermined one of said stored third signals being provided to said fourth means of said third set of means analogously to the provision of said applied signals and said predetermined one of said stored third signals to said fourth means of said first set of means, said second signals of said third set of means being provided as the output signals of said third set of means, whereby the output signals of said third set of means provides a sum of the cubes of signals of said submatrix, which are indicative of the third uncentered moment of said submatrix.

5. The apparatus of claim 4 further comprising:
(a) a fourth processing section which includes a fourth set of first, second, fourth and fifth means as provided in claim 2; and
(b) multiplier means for responding to and for providing signals indicative of the fourth power of said applied signals and said predetermined one of said stored third signals provided by said third means of said first set of means, said multiplied applied signal and said multiplied predetermined one of said stored third signals being provided to said fourth means of said fourth set of means analogously to the application of said applied signals and said predetermined one of said stored third signals to said fourth means of said first set of means, said second signals of said fourth set of means being provided as the output signals of said second set of means, whereby the output signals of said fourth set of means provides signals indicative of a sum of signals of said submatrix raised to the fourth power, which are indicative of the fourth uncentered moment of said submatrix.

6. The apparatus of claim 3 further comprising:
(a) circuitry for combining the output signals from said first and second processing sections to provide output signals indicative of the second centered moment of said submatrix, which is defined by the equation:

$$M2 = 1/N^2(\Sigma x_i)^2 + 1/N\Sigma x_i^2,$$

wherein the partial term $(\Sigma x_i)$ is the uncentered moment output signal of said first processing section and the partial term $\Sigma x_i^2$ is the uncentered moment output signal of said second processing section.

7. The apparatus of claim 4 further comprising:
(a) circuitry for combining the output signals from said first, second and third processing sections to provide output signals indicative of the third centered moment of said submatrix, which is defined by the equation:

$$M3 = 2/N^3(\Sigma x_i)^3 - 3/N^2\Sigma x_i^2(\Sigma x_i) + 1/N\Sigma x_i^3,$$

wherein the partial term $(\Sigma x_i)$ is the uncentered moment output signal of said first processing section, the partial term $\Sigma x_i^2$ is the uncentered moment output signal of said second processing section, and $\Sigma x_i^3$ is the uncentered moment output signal of said third processing section.

8. The apparatus of claim 5 further comprising:
(a) circuitry for combining the output signals from said first, second, third and fourth processing sections to provide output signals indicative of the fourth centered moment of said submatrix, which is defined by the equation:

$$M4 = -3/N^4(\Sigma x_i)^4 + 6/N^3\Sigma x_i^2(\Sigma x_i)^2 - 4/N^2\Sigma x_i^3(\Sigma x_i) + 1/N\Sigma x_i^4,$$

wherein the partial term $(\Sigma x_i)$ is the uncentered moment output signal of said first processing section, the partial term $\Sigma x_i^2$ is the uncentered moment output signal of said second processing section, the partial term $\Sigma x_i^3$ is the uncentered moment output signal of said third processing section, and the partial term $\Sigma x_i^4$ is the uncentered moment output signal of said fourth processing section.

9. An image processing system for processing a plurality of signals, each of said signals being indicative of a corresponding pixel within a pixel matrix array, said signals being successively applied to said system in a predetermined order, said system comprising:
(a) a first processing section including:
(i) a first storage register for storing a plurality of said applied signals corresponding to a first submatrix of said matrix array, said first submatrix includes the pixels located in all of the columns and given number of rows of said matrix;
(ii) a second storage register for storing signals that are indicative of the columnar sums of said signals corresponding to the pixels of said first submatrix;
(iii) a third storage register for storing an output signal indicative of the sum of a given subset of said columnar sums, said output signal thereby being indicative of the sums of the signals corresponding to a second submatrix of pixels, and second submatrix including all of the rows and a given number of columns of said first submatrix, said given number of columns corresponding to said given subset of columnar sums;
(iv) a first summing circuit for generating updated columnar sum signals, each being indicative of the sum of one of said applied signals, one of said columnar sum signals stored in said second register, and the negative of one of said signals stored in said first register, said signals in each summation corresponding to a given one of the columns of said matrix, said updated columnar sum signals being applied to said second storage register; and
(v) a second summing circuit for generating updated output signals, each being indicative of the sum of one of the updated columnar sums generated by said first summing circuit, said output signal stored in said third register, and the negative of one of said columnar sum signals stored in said second register, said updated columnar sum signals and said stored columnar sum signals in each summation corresponding to columns of said first submatrix that are respectively being included in and deleted from said second submatrix, said updated output signals being applied to said third storage register and further provided as output signals from said first processing section.

10. The image processing system of claim 9 further comprising:
(a) a plurality of second processing sections, each including:
(i) a set of storage registers including storage registers that are substantially identical to said second and third storage registers of said first processing section;

(ii) a set of summing circuits including summing circuits that are substantially identical to said first and second summing circuits of said first processing section, said second and third registers of said set of storage registers and said first and second summing circuits of said set of summing circuits being interconnected substantially identical to the interconnection of said second and third registers and first and second summing circuits of said first processing section, the transfer of signals between said set of storage registers and said set of summing circuits being directly analogus to the transfer of signals between said second and third registers and said first and second summing circuits of said first processing section, the signals transferred to said third storage register being also provided as the output signals of each of the respective ones of said second processing sections;

(iii) a first multiplier circuit for generating multiplied applied signals that are indicative of said applied signals raised by a given power, said multiplied applied signals being applied to said first summing circuit of said set of summing circuits substantially identical to the application of said applied signals to said first summing circuit of said first processing section; and (iv) a second multiplier circuit for generating multiplied stored applied signals that are indicative of said signals stored in said first register of said first processing section raised by said given power, said multiplied stored applied signals being applied to said first summing circuit of said set of summing circuits substantially identical to the application of said signals stored in said first register of said first processing section to said first summing circuit of said first processing section.

11. The image processing system of claim 10 wherein the output signals of each of said first and second processing sections are indicative of a respective uncentered moment of the signals corresponding to said second submatrix, said system further comprising circuitry associated with each of said first and second processing sections for combining the uncentered moment output signals of said first and second processing sections to provide respective output signals that are indicative of the centered moments of the signals corresponding to said second submatrix.

* * * * *